Jan. 7, 1969     E. P. MALHERBE     3,419,922
FENCES FOR WHEELED STRETCHERS AND BEDS
Filed Oct. 3, 1966     Sheet 2 of 2
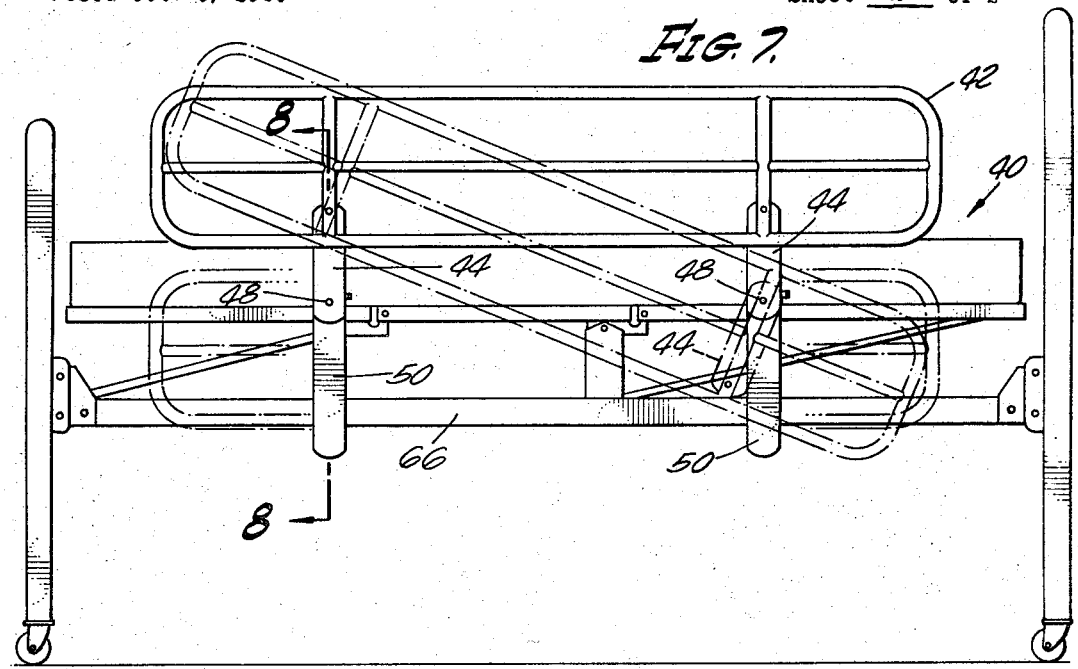
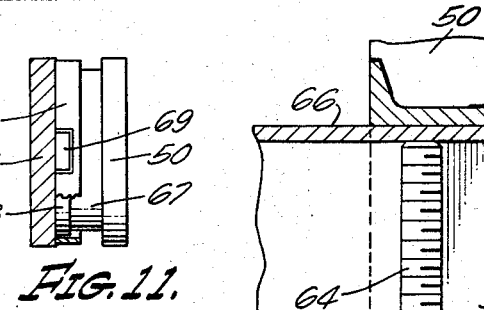
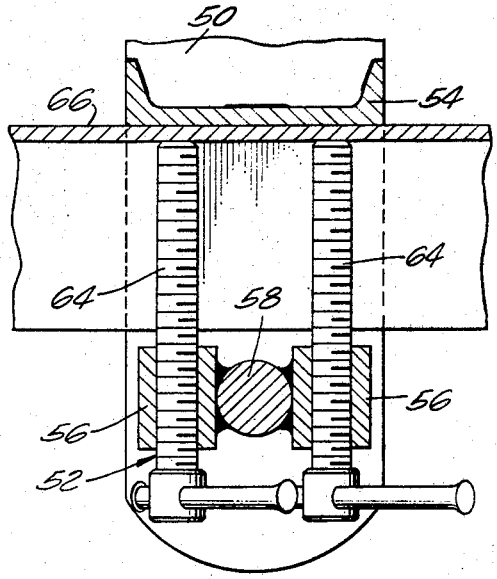
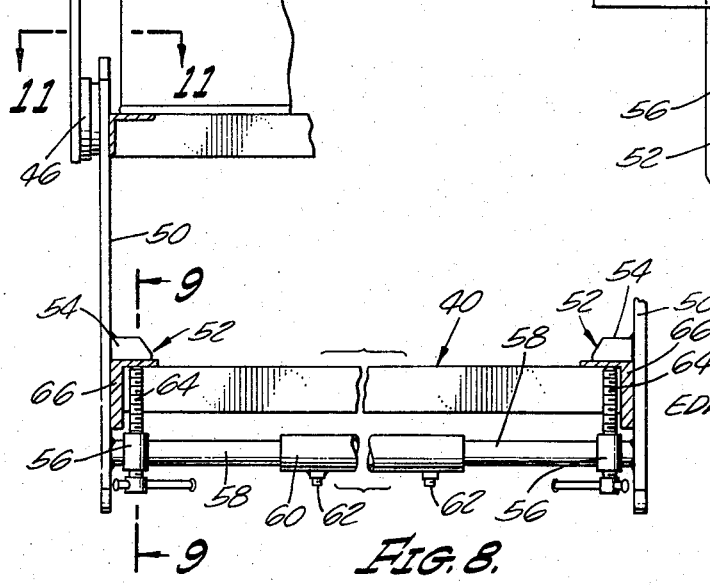
EDWARD P. MALHERBE
INVENTOR.
BY
ATTORNEY United States Patent Office 3,419,922
Patented Jan. 7, 1969

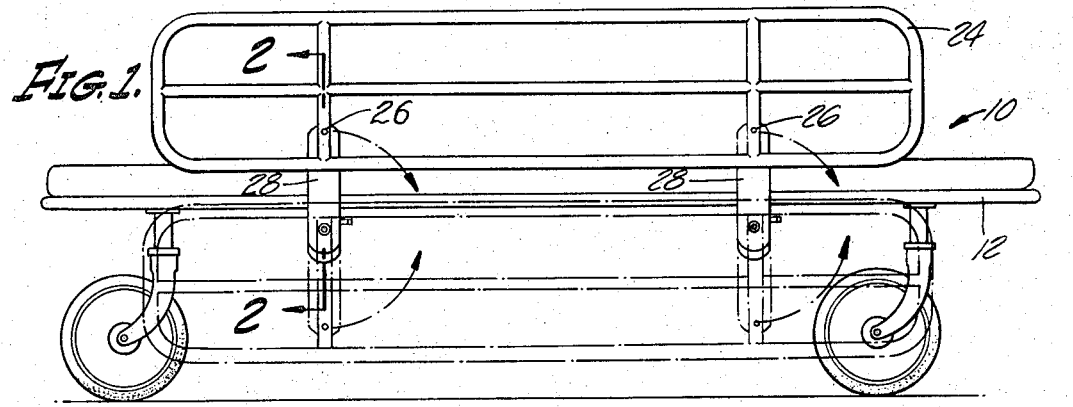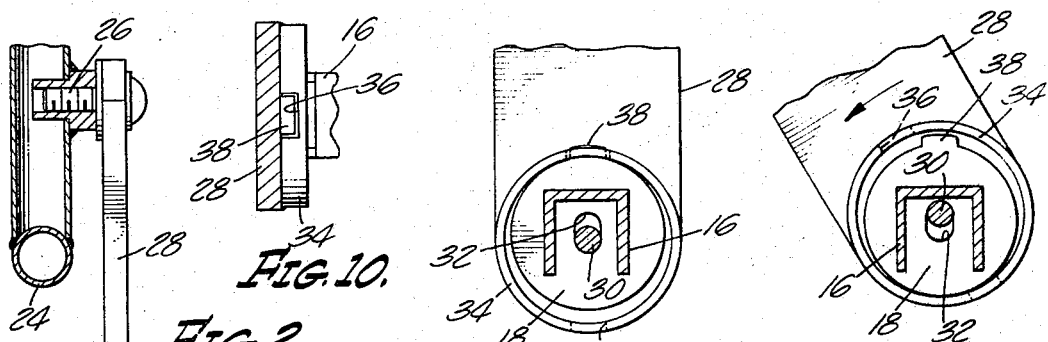

3,419,922
FENCES FOR WHEELED STRETCHERS AND BEDS
Edward P. Malherbe, Los Angeles, Calif., assignor to Everest & Jennings, Inc., Los Angeles, Calif., a corporation of California
Filed Oct. 3, 1966, Ser. No. 583,545
U.S. Cl. 5—331                                        6 Claims
Int. Cl. A47c 21/08

ABSTRACT OF THE DISCLOSURE

A side rail for stretchers, hospital beds or the like comprising a fence with pivotal connecting means permitting raising and lowering of the fence, the pivotal connecting means having associated therewith means for interlocking a pair of relatively movable parts to releasably secure the fence in either its raised or lowered position.

---

This invention relates to a fence or side rail for wheeled stretchers, hospital beds or the like.

It is an object of the invention to provide a fence which conveniently can be raised and lowered to and from patient confining positions wherein the movement can be accomplished quickly and conveniently by an attendant without disturbing the patient or the coverings on the stretcher or bed.

Another object of the invention is to provide a device of the class described wherein the fence can be releasably locked in its raised position, and while readily releasable and lowerable, is firmly retained against accidental displacement by uncontrolled movements of the patient.

A further object of the invention is to provide a bed fence which can be raised and lowered in its entirety, or where one end or the other can be lowered, leaving the other end in its raised position.

The above and other objects will more fully appear from the following description in connection with the accompanying drawings:

FIG. 1 is a side elevational view of an embodiment as applied to a wheeled stretcher, the fence being shown in full and broken lines in its raised and lowered positions respectively;

FIG. 2 is an enlarged detail taken approximately on the line 2—2 of FIG. 1;

FIG. 3 is a section taken approximately on the line 3—3 of FIG. 2;

FIG. 4 is a view similar to FIG. 2 but with the pivotal connecting means for the fence raised to a position permitting swinging movement of the fence;

FIG. 5 is a fragmentary detail showing the pivotal connecting means on the fence swung from its upward position;

FIG. 6 is a detail in perspective of a portion of the pivotal connecting means;

FIG. 7 is a side elevational view of a hospital bed with a fence mounted thereon, the fence being shown in full lines in its raised position and in broken lines in other positions to which it can be moved;

FIG. 8 is an enlarged sectional view taken approximately on the line 8—8 of FIG. 7;

FIG. 9 is an enlarged sectional view taken approximately on the line 9—9 of FIG. 8.

FIG. 10 is a sectional view taken approximately on the line 10—10 of FIG. 2;

FIG. 11 is a sectional view taken approximately on the line 11—11 of FIG. 8.

In FIG. 1 there is shown a conventional wheeled stretcher 10. It is provided with longitudinal side bars 12. Extending transversely between the side bars 12 and suitably secured thereto, is a squared tube 14 in the ends of which are inverted U-shaped members 16 having discs 18 on their ends, said discs providing portions of pivot means for the fence. The members 16 are provided with slots 20 to receive pins 22 which are carried by the tube 14 and permit longitudinal adjustment of the members 16 in the tubes 14 for accommodation of the fence to the bed.

A fence 24 of suitable construction has pivoted thereto at 26, links 28. The lower end of each link 28 is provided with a pivot bolt 30 which extends through a vertically elongated aperture 32 in the disc 18 which is secured to the end of each inverted U-shaped member 16. Concentrically about the pivot bolt 30 is a circular element 34 in which are spaced slots to provide detent receivers 36 which are adapted to selectively receive a detent 38 which extends radially from the edge of the disc 18. As shown in FIGS. 3 and 5, the cage provided by the circular member 34 has an internal diameter slightly greater than the distance from the bottom edge of the disc 18 to the outer edge of the detent 38, so that the pivot link 28 and the cage provided by the circular member 34 can swing about disc 18 and detent 38 when said detent is freed from either of the detent receivers 36.

In FIGS. 2 and 3 the links 28 are in a vertical position with the detent 38 in the upper detent receiver 36. This holds the fence 24 in a vertical position as shown in FIG. 1, and provides lateral stability outwardly from the bed and patient. In order to lower the fence, it is lifted horizontally to free the detents 38 from the upper receivers 36 on both links 28 and the fence can be swung downward in a clockwise or counterclockwise direction. The direction of swing in FIG. 5 is shown to be clockwise, but of course it can be in the opposite direction. When the fence and the links 28 are swung 180° downwardly from their upper position, the detent 38 will be received in the opposite detent receiver 36 which in that position is located upwardly, and the weight of the fence will hold the detent in the receiver so that the fence will not swing undesirably during movement of the stretcher 10.

FIGS. 7, 8 and 9 show the fence as it is adapted to a hospital bed 40. A fence 42 is pivotally connected with links 44 in the same manner as the previously described fence and its links 28. The lower end of each link 44 is provided with a cage 46 defined by the circular member, the same as the circular member 34 of the first embodiment. The lower end of each link 44 is provided with a pivot bolt 48 corresponding to the pivot bolts 30, previously described. A disc 68 and detent 69 corresponding to the disc 18 and detent 38 are shown in FIG. 11 with the spacer 67 attaching disc 68 to upright 50. The lower ends of uprights 50 are provided with clamp units generally designated at 52. These clamp units include lugs 54 and a pair of downwardly spaced internally threaded sleeves 56, welded or otherwise suitably secured to rods 58 which telescope into a central transverse tube 60 provided with set screws 62 for engaging the rods 58. The internally threaded sleeves 56 receive threaded bolts 64 which are adapted to engage the under portions of bed rails 66 with the lugs 54 overlying the bed rails.

As shown in FIG. 7, the fence 42 (and likewise the fence 24 of FIG. 1) can be moved to a diagonal broken line position. This may be desirable in instances where an attendant may wish to treat or give care to an upper or lower portion of the patient while leaving the other end of the fence in a position to prevent a restless person from rolling off or partially off the bed. To achieve the diagonal position of FIG. 7, the fence can be rotated clockwise from its upper full line position until the links 44 are parallel. Then the right end of the fence, as viewed in FIG. 7, is moved downwardly and the left end raised. Obviously, the left end of the fence can be dropped diagonally in a position opposite to that shown in FIG. 7 where desired. It should be noted that by lifting only one link the fence is still locked. Both links 28 have to be lifted to lower the fence.

From the foregoing description it can be seen that I have provided a stretcher or bed fence which is so supported that it will swing smoothly from a raised to a lowered position and be held against accidental displacement from either psoition. The operation is simple and smooth and the construction is such that in its operation it will not interfere with or be interfered with by the bed clothing. It does not require the manual release of any latching means except through the mere raising of the fence a slight distance to free the detent from its receiver. A nurse or other attendant can operate the fence with one hand when it is grasped approximately at its upper central portion.

It should be understood that various changes can be made in the form, details, arrangement and proportions of the various parts without departing the spirit of the invention.

I claim:

1. A side rail for attachment to the frame of a stretcher, bed or the like, comprising a fence, pivotal connecting means with a portion pivotally connected to said fence by a single pivot and another portion having bed frame connection means associated therewith, said pivotal connecting means permitting swinging of said fence in a generally vertical plane to elevated and lowered positions relative to said bed frame, vertically separable interlocking elements asociated with one each of the relatively movable portions of said pivotal connecting means, said fence and one of said interlocking elements having means providing limited upward shifting of the fence and said one of said interlocking elements relative to the other interlocking element to free the interlocking elements and the fence for swinging movement of the fence in its vertical plane, one of said interlocking elements being movable with said pivotal connecting means, and one of said interlocking elements comprising a guide for the other interlocking element to maintain said interlocking elemetns in a predetermined relationship during swinging movement of said fence.

2. A side rail for attachment to the frame of a stretcher, bed or the like, comprising a fence, pivotal connecting means with a relatively movable portion connected for movement with said fence and another relatively stationary portion having bed frame connection means associated therewith, said pivotal connecting means permitting swinging of said fence in a generally vertical plane to elevated and lowered positions relative to said bed frame, vertically separable interlocking elements associated with one each of the portions of said pivotal connecting means, said fence and one of said interlocking elements having means providing limited upward shifting of the fence and said one of said interlocking elements relative to the other interlocking element to free the interlocking elements and the fence for swinging movement of the fence in its vertical plane, and said interlocking elements including means providing upper and lower fence position indexing stops correlated to the elevated and lowered positions of said fence and interchangeable under the weight of the fence.

3. The structure in claim 2, and said interlocking means comprising a pair of members, one of which is rotatable relative to the other, one lying concentrically to the other, one each mounted for movement with a movable portion of said pivotal connecting means, one of said members having a detent and the other having means for removably engaging and disengaging said detent in a vertical direction.

4. The structure in claim 2, and one of said interlocking elements comprising a rounded member, the other interlocking element defining a rounded cage portion lying about said rounded member, one each of said rounded member and cage portion having a detent receiver and a detent alignable therewith for interlocking along a generally perpendicular line.

5. The structure in claim 4, and said cage portion comprising a flange having upper and lower detent receivers and said detent being upwardly disposed on said rounded member.

6. A side rail for attachment to the frame of a stretcher, bed or the like comprising a fence, a mounting unit, pivot means having connections with said mounting unit and said fence, said pivot means having relatviely rotatable portions defining common horizontal pivotal axes, one of said connections being shiftable vertically relative to the other, a detent and a detent receiver, one of said connections, and the detent and detent receiver, being engageable and disengageable upon vertical shifting of said one of said connections.

References Cited

UNITED STATES PATENTS

| 2,817,855 | 12/1957 | Pratt | 5—331 |
| 3,125,769 | 3/1964 | Black et al. | 5—331 |
| 3,234,570 | 2/1966 | Hutt. | |

FOREIGN PATENTS 179,294  5/1962  Sweden.

BOBBY R. GAY, *Primary Examiner.*

R. D. KRAUS, *Assistant Examiner.*